(12) United States Patent
Tsuda et al.

(10) Patent No.: US 6,738,584 B1
(45) Date of Patent: May 18, 2004

(54) METHOD FOR OPTICAL FIBER COMMUNICATION, AND TERMINAL DEVICE AND SYSTEM FOR USE IN CARRYING OUT THE METHOD

(75) Inventors: Takashi Tsuda, Kawasaki (JP); Kazuo Yamane, Kawasaki (JP); Yumiko Kawasaki, Shinagawa-ku (JP); Satoru Okano, Sapporo (JP)

(73) Assignee: Fujitsu Ltd., Kawasaki (JP)

( * ) Notice: Subject to any disclaimer, the term of this patent is extended or adjusted under 35 U.S.C. 154(b) by 0 days.

(21) Appl. No.: 09/349,446

(22) Filed: Jul. 8, 1999

(30) Foreign Application Priority Data

Jul. 8, 1998 (JP) .............................. 10-192530

(51) Int. Cl.[7] .............................................. H04J 14/02
(52) U.S. Cl. ........................ 398/147; 385/123; 398/160; 398/197
(58) Field of Search ..................... 359/153, 161, 359/177, 152, 154, 160, 174, 187, 188, 124; 385/123; 398/81, 94, 136, 147, 148, 158, 160, 173, 197

(56) References Cited

U.S. PATENT DOCUMENTS

| | | | |
|---|---|---|---|
| 5,162,936 A | 11/1992 | Taga et al. .................. 359/177 |
| 5,343,320 A | * 8/1994 | Anderson .................... 359/160 |
| 5,608,562 A | 3/1997 | Delavaux et al. ........... 359/161 |
| 5,726,794 A | * 3/1998 | Tajima ....................... 359/249 |
| 5,760,940 A | * 6/1998 | Frigo ......................... 359/173 |
| 5,831,754 A | * 11/1998 | Nakano ...................... 359/161 |
| 5,900,959 A | * 5/1999 | Noda et al. ................. 359/188 |
| 5,963,312 A | * 10/1999 | Roberts ...................... 356/73.1 |
| 5,999,289 A | * 12/1999 | Ihara et al. ................. 359/124 |
| 6,115,157 A | * 9/2000 | Barnard et al. ............. 359/124 |
| 6,157,477 A | * 12/2000 | Robinson .................... 359/161 |
| 6,320,687 B1 | * 11/2001 | Ishikawa .................... 359/161 |

FOREIGN PATENT DOCUMENTS

| | | |
|---|---|---|
| EP | 61012138 | 6/1986 |
| JP | 5-327625 | 12/1993 |

OTHER PUBLICATIONS

Communication dated Jul. 31, 2002, including a European Search Report.

* cited by examiner

Primary Examiner—Brent A. Swarthout
(74) Attorney, Agent, or Firm—Staas & Halsey LLP

(57) ABSTRACT

The present invention relates to a method for optical fiber communication, and a terminal device and system for use in carrying out the method, and an object of the present invention is to compensate for chromatic dispersion and nonlinearity. A device for outputting an optical signal having a variable optical power into an optical fiber transmission line is provided. The optical signal transmitted by the transmission line is converted into an electrical signal by an optical receiver. A parameter related to waveform degradation of the electrical signal is detected by a monitor unit. A control unit controls the optical power of the optical signal to be output from the device so that the waveform degradation is improved.

17 Claims, 11 Drawing Sheets

ANOMALOUS DISPERSION REGION

NORMAL DISPERSION REGION

METHOD FOR OPTICAL FIBER COMMUNICATION, AND TERMINAL DEVICE AND SYSTEM FOR USE IN CARRYING OUT THE METHOD

BACKGROUND OF THE INVENTION

1. Field of the Invention

The present invention relates generally to compensation for chromatic dispersion and nonlinearity in optical fiber communication, and more particularly to a method for optical fiber communication which can compensate for chromatic dispersion and nonlinearity to allow long-haul transmission, and a terminal device and system for use in carrying out the method.

2. Description of the Related Art

Owing to recent developments of low-loss silica optical fibers, various optical fiber communication systems each using such an optical fiber as a transmission line have been put to practical use. The optical fiber itself has a very wide band. However, a transmission capacity by the optical fiber is actually limited by a system design. The most important limitation is due to waveform distortion by chromatic dispersion occurring in the optical fiber. Further, the optical fiber attenuates an optical signal at a rate of about 0.2 dB/km, for example. Loss of the optical signal due to this attenuation has been compensated for by adopting an optical amplifier such as an erbium doped fiber amplifier (EDFA) that is a typical example. The EDFA has a gain band in a 1.55 $\mu$m band where a silica optical fiber gives a lowest loss.

The chromatic dispersion that is often referred to simply as dispersion is a phenomenon such that the group velocity of an optical signal in an optical fiber changes as a function of the wavelength (or frequency) of the optical signal. In a standard single-mode fiber, for example, an optical signal having a longer wavelength propagates faster than an optical signal having a shorter wavelength in a wavelength region shorter than 1.3 $\mu$m, and the resultant dispersion is usually referred to as normal dispersion. In this case, the dispersion (whose unit is ps/nm/km) takes on a negative value. In contrast, an optical signal having a shorter wavelength propagates faster than an optical signal having a longer wavelength in a wavelength region longer than 1.3 $\mu$m, and the resultant dispersion is usually referred to as anomalous dispersion. In this case, the dispersion takes on a positive value.

In recent years, the nonlinearities of an optical fiber have received attention in association with an increase in optical signal power due to the use of an EDFA. The most important nonlinearity that limits a transmission capacity is an optical Kerr effect occurring in an optical fiber. The optical Kerr effect is a phenomenon such that the refractive index of an optical fiber changes with the power or intensity of an optical signal.

A change in the refractive index modulates the phase of an optical signal propagating in an optical fiber, resulting in the occurrence of frequency chirping which changes a signal spectrum. This phenomenon is known as self-phase modulation (SPM). There is a possibility that such a change in spectrum due to SPM may further enlarge the waveform distortion due to chromatic dispersion.

In this manner, the chromatic dispersion and the optical Kerr effect impart waveform distortion to an optical signal with an increase in transmission distance. Accordingly, to allow long-haul transmission by an optical fiber while ensuring a transmission quality, the chromatic dispersion and the nonlinearity must be controlled, compensated, or suppressed.

SUMMARY OF THE INVENTION

It is therefore an object of the present invention to provide a method for optical fiber communication which can compensate for chromatic dispersion and nonlinearity to allow long-haul transmission, and to also provide a terminal device and system for use in carrying out the method.

In accordance with an aspect of the present invention, there is provided a method for optical fiber communication. First, a device for outputting an optical signal having a variable optical power to an optical fiber transmission line is provided. Secondly, the optical signal transmitted by the optical fiber transmission line is converted into an electrical signal. Thirdly, a parameter (e.g., a bit error rate or an eye opening) related to waveform degradation of the electrical signal is detected. Finally, the optical power of the optical signal to be output to the optical fiber transmission line is controlled according to the parameter detected so that the waveform degradation of the electrical signal is improved.

In general, nonlinearity of an optical fiber or a nonlinear phenomenon occurring in an optical fiber used as the optical fiber transmission line is dependent on the optical power of an optical signal to be output to the optical fiber. In the method of the present invention, the optical power of the optical signal is changed according to the state of the optical fiber transmission line, e.g., according to the kind of an optical fiber used as the optical fiber transmission line, thereby controlling the nonlinearity of the optical fiber. Therefore, long-haul transmission is allowed with a transmission quality being ensured by compensation for chromatic dispersion and nonlinearity.

In accordance with another aspect of the present invention, there is provided a system comprising first and second terminal devices and an optical fiber transmission line connecting the first and second terminal devices. The first terminal device comprises an optical transmitter for outputting an optical signal having a variable optical power to the optical fiber transmission line. The second terminal device comprises an optical receiver for converting the optical signal transmitted by the optical fiber transmission line into an electrical signal, a monitor unit for detecting a parameter related to waveform degradation of the electrical signal, and means for transmitting supervisory information on the parameter detected to the first terminal device. The first terminal device further comprises a control unit for controlling the optical power according to the supervisory information so that the waveform degradation of the electrical signal is improved.

In accordance with a further aspect of the present invention, there is provided a terminal device comprising an optical transmitter for outputting an optical signal having a variable optical power to an optical fiber transmission line; means for receiving supervisory information on a parameter detected in relation to waveform degradation of the optical signal transmitted by the optical fiber transmission line; and means for controlling the optical power according to the supervisory information so that the waveform degradation of the optical signal is improved.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
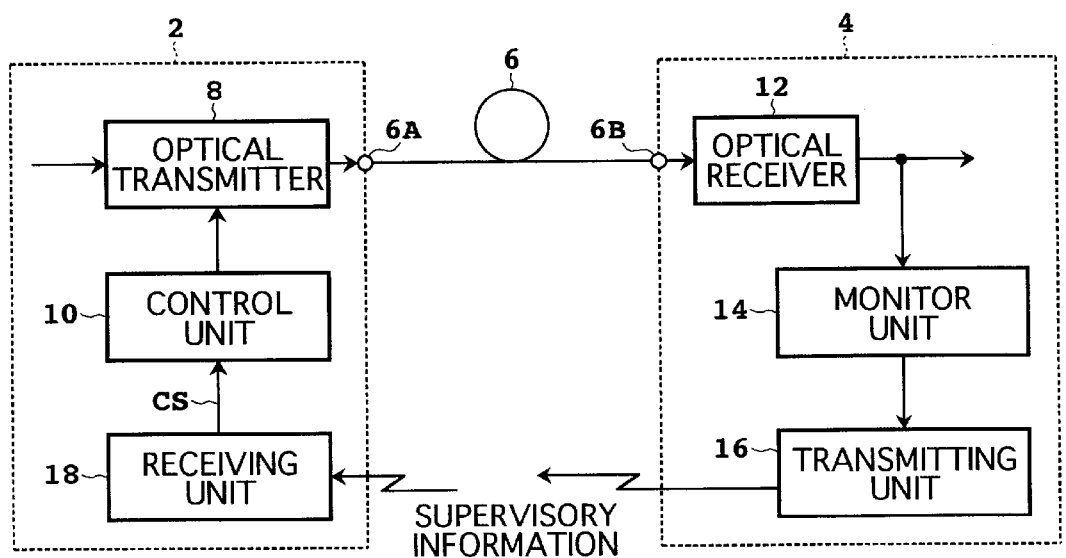
FIG. 1 is a block diagram showing a basic configuration of the system according to the present invention.

Some preferred embodiments of the present invention will now be described in detail with reference to the attached drawings. Throughout the drawings, substantially the same parts are denoted by the same reference numerals.

FIG. 1 is a block diagram showing a basic configuration of the system according to the present invention. This system includes a first terminal device 2, a second terminal device 4, and an optical fiber transmission line 6 connecting the first and second terminal devices 2 and 4.

The first terminal device 2 includes an optical transmitter 8 for outputting an optical signal having a variable optical power to the optical fiber transmission line 6 from its first end 6A, and a control unit 10 for controlling the power of the optical signal to be output from the optical transmitter 8 according to a control signal CS supplied.

The second terminal device 4 includes an optical receiver 12 for converting the optical signal transmitted by the optical fiber transmission line 6 into an electrical signal, and a monitor unit 14 for detecting a parameter related to waveform degradation of the electrical signal output from the optical receiver 12. The second terminal device 4 further includes a transmitting unit 16 for transmitting supervisory information on the parameter detected to the first terminal device 2.

The first terminal device 2 further includes a receiving unit 18 for receiving the supervisory information transmitted from the second terminal device 4. The receiving unit 18 generates the control signal CS to be supplied to the control unit 10 according to the supervisory information so that the waveform degradation of the electrical signal output from the optical receiver 12 is improved. For example, the receiving unit 18 generates the control signal CS so that a bit error of the electrical signal output from the optical receiver 12 is reduced or so that an eye opening of the electrical signal output from the optical receiver 12 becomes large.

The transmission of the supervisory information from the transmitting unit 16 to the receiving unit 18 may be performed by using the optical fiber transmission line 6, by using another optical fiber transmission line (not shown in FIG. 1), or by means of an electrical circuit or a wireless circuit.

Figure 2:
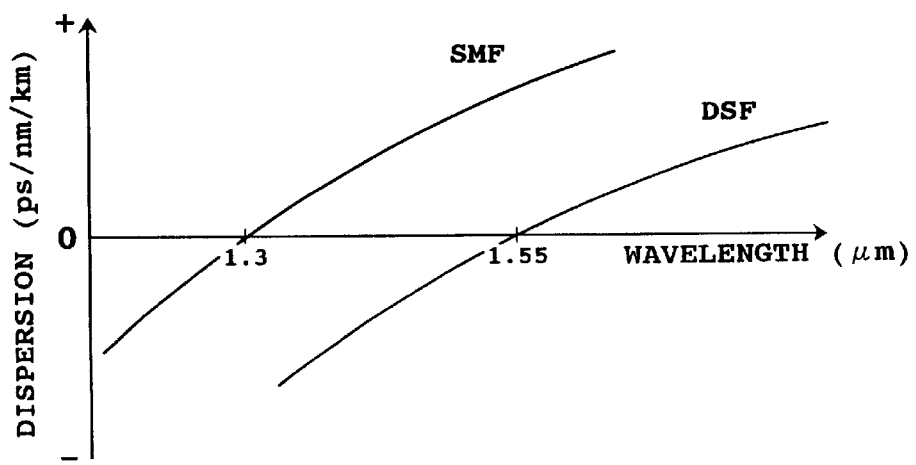
FIG. 2 is a graph showing dispersion characteristics of optical fibers.

FIG. 2 is a graph showing dispersion characteristics of optical fibers usable as the optical fiber transmission line 6. In FIG. 2, the vertical axis represents dispersion (ps/nm/km) and the horizontal axis represents wavelength ($\mu$m).

In the case that a usual single-mode fiber (SMF) is used as the optical fiber transmission line 6, the zero-dispersion wavelength of the SMF is about 1.3 $\mu$m. In this case, the dispersion falls in a region of anomalous dispersion for an optical signal having a wavelength longer than the zero-dispersion wavelength, and has a positive value. Conversely, the dispersion falls in a region of normal dispersion for an optical signal having a wavelength shorter than the zero-dispersion wavelength, and has a negative value. In the case of using an SMF as the optical fiber transmission line 6, the wavelength of an optical signal is set to fall in a 1.55 $\mu$m band (e.g., 1.50 to 1.60 $\mu$m) giving a minimum loss in the SMF. Accordingly, the dispersion for the optical signal falls always in a region of anomalous dispersion.

In the case that a dispersion shifted fiber (DSF) is used as the optical fiber transmission line 6, the zero-dispersion wavelength of the DSF is about 1.55 $\mu$m. Also in this case, the dispersion falls in a region of anomalous dispersion for an optical signal having a wavelength longer than the zero-dispersion wavelength, and has a positive value. Conversely, the dispersion falls in a region of normal dispersion for an optical signal having a wavelength shorter than the zero-dispersion wavelength, and has a negative value. Because the wavelength giving a minimum loss in the DSF is also equal to about 1.55 $\mu$m, the wavelength of an optical signal is set to fall in a 1.55 $\mu$m band. Accordingly, whether the dispersion in the DSF falls in a region of anomalous dispersion or in a region of normal dispersion is determined according to the correlation between the actual wavelength of an optical signal and the zero-dispersion wavelength of the DSF.

There will now be described a transmittable distance in the case of using each of a DSF and an SMF as the optical fiber transmission line 6.

Figure 3A:
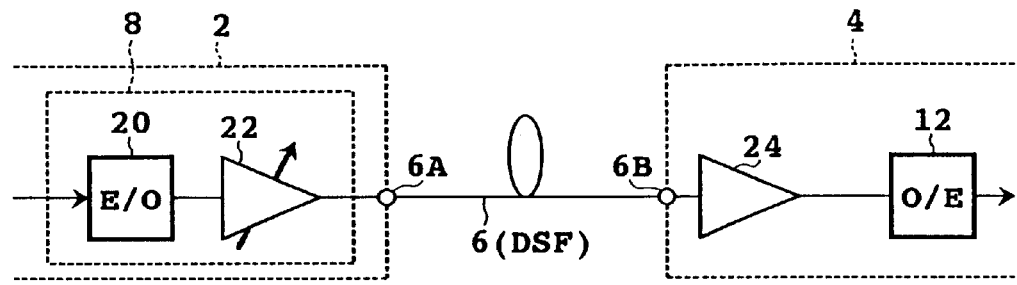
FIGS. 3A to 3C are diagrams for illustrating a transmittable distance in the case of using a DSF (dispersion shifted fiber)

Referring to FIG. 3A, there is shown an essential part of the system shown in FIG. 1 in the case of using a DSF as the optical fiber transmission line 6. In this case, the optical transmitter 8 in the first terminal device 2 includes an E/O converter (electro/optical converter) 20 for converting an input electrical signal into an optical signal, and a variable gain type optical amplifier 22 for amplifying the optical signal output from the E/O converter 20. The gain of the optical amplifier 22 is adjusted by the control unit 10 (see FIG. 1) to thereby change the optical power of the optical signal to be output to the optical fiber transmission line 6. Further, an optical amplifier 24 is additionally provided as a preamplifier in the second terminal device 4 in order to enhance a receiver sensitivity. The optical amplifier 24 is optically connected between the second end 6B of the optical fiber transmission line 6 and the optical receiver (or an O/E converter (opto/electrical converter) 12.

Figure 4A:
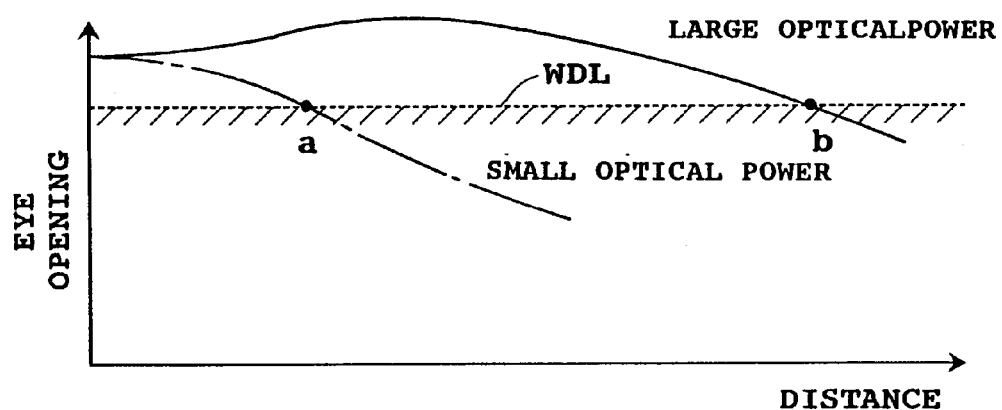
FIGS. 4A and 4B are diagrams for illustrating a transmission characteristic of the DSF.
Figure 4B:
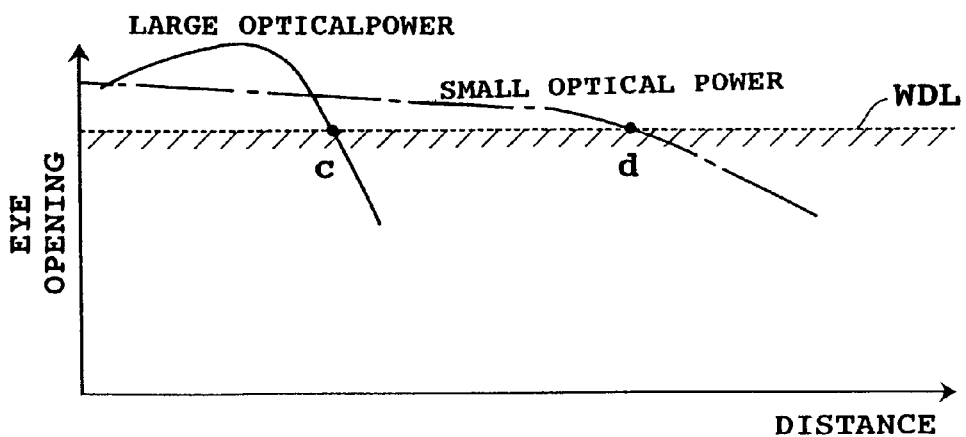

Referring to FIGS. 4A and 4B, there are shown transmission characteristics of a DSF in the anomalous dispersion region and the normal dispersion region, respectively. Attention should be herein directed to the facts that a red-shift chirping is given to an optical signal in the anomalous dispersion region, that a blue-shift chirping is given to an optical signal in the normal dispersion region, and that the chirping given to an optical signal having a large optical power by SPM is always a blue-shift chirping. It is easier to obtain an optical signal having a red-shift chirping than to obtain an optical signal having a blue-shift chirping. Accordingly, it is assumed herein that the optical signal to be output from the optical transmitter 8 has a red-shift chirping.

In each of FIGS. 4A and 4B, the vertical axis represents the eye opening of an equalized signal waveform in the optical receiver 12, and the horizontal axis represents the transmission distance.

In the case that the optical power of the optical signal to be output from the optical transmitter 8 is relatively small, the nonlinearity of the optical fiber transmission line 6 is negligible. Therefore, in the anomalous dispersion region, the red-shift chirping given in the optical transmitter 8 and the red-shift chirping given in the optical fiber transmission line 6 are combined together, and the transmittable distance given by a distance at which the eye opening becomes lower than a waveform degradation limit WDL is relatively short as shown by reference symbol (a) in FIG. 4A. In contrast thereto, in the normal dispersion region, the red-shift chirping given in the optical transmitter 8 and the blue-shift chirping given in the optical fiber transmission line 6 are canceled by each other to produce an effect of compression of the waveform or pulse width of the optical signal, so that the transmittable distance is relatively long as shown by reference symbol (d) in FIG. 4B.

In the case that the optical power of the optical signal to be output from the optical transmitter 8 is relatively large, the nonlinearity of the optical fiber transmission line 6 must be considered. In consideration of losses in the optical fiber transmission line 6, the blue-shift chirping due to SPM will be dominant at a portion of the optical fiber transmission line 6 in the vicinity of the first end 6A (e.g., a portion at a distance of tens of km). More specifically, in the case that the optical power of the optical signal to be output from the optical transmitter 8 is relatively large, the red-shift chirping given in each of the optical transmitter 8 and the optical fiber transmission line 6 and the blue-shift chirping due to SPM are canceled by each other in the anomalous dispersion region, so that the transmittable distance is relatively long as shown by reference symbol (b) in FIG. 4A. In contrast thereto, in the normal dispersion region, the blue-shift chirping due to chromatic dispersion and the blue-shift chirping due to SPM are combined together, so that the transmittable distance is relatively short as shown by reference symbol (c) in FIG. 4B.

Figure 3B:
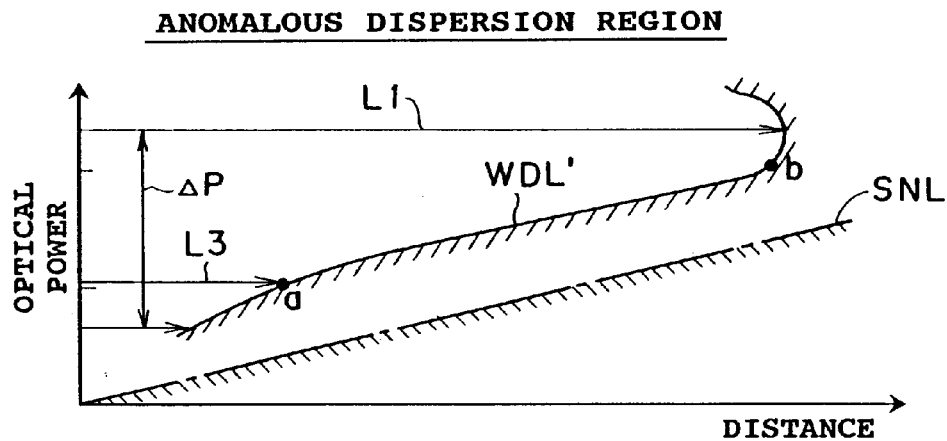
Figure 3C:
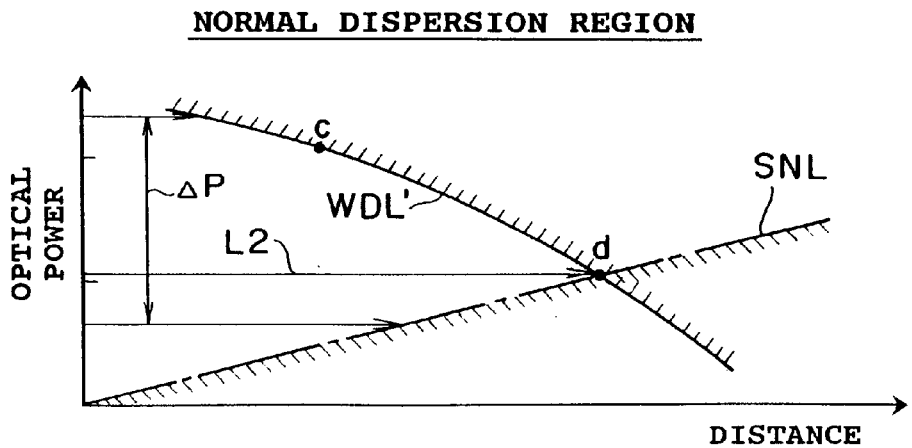

FIGS. 3B and 3C show the relation between optical power and distance as converted from FIGS. 4A and 4B, respectively. It is necessary to consider an SN limit of a received signal as a transmission limiting factor. In each of FIGS. 3B and 3C, the SN limit is denoted by reference symbol SNL. Further, reference symbol WDL' in each of FIGS. 3B and 3C corresponds to the waveform degradation limit WDL shown in each of FIGS. 4A and 4B.

In a region on the left side of the SNL and on the left side of the WDL' in each of FIGS. 3B and 3C, transmission with a fixed transmission quality is allowed. For example, in the case that the variable range of the optical power of the optical signal to be output from the optical transmitter 8 is set to ΔP, the transmittable distance L1 is determined by the WDL' in the anomalous dispersion region as shown in FIG. 3B, whereas the transmittable distance L2 is determined by the WDL' and the SNL in the normal dispersion region as shown in FIG. 3C. That is, in the system shown in FIG. 3A, the gain of the optical amplifier 22 is adjusted to thereby adjust the optical power of the optical signal to be output from the optical transmitter 8, so that an optimum condition of compensation for chromatic dispersion and nonlinearity can be obtained to thereby allow long-haul transmission.

In the prior art, the range of the optical output power from an optical transmitter is fixedly assigned in general to design a system in consideration of variations in the optical power within this range. Accordingly, the transmittable distance L3 is determined (or limited) by the worst condition. To the contrary, by controlling or adjusting the optical power of the optical signal to be output from the optical transmitter 8 by the method according to the present invention, a good transmission quality can always be obtained according to the state of the optical fiber transmission line 6, thereby obtaining a long transmittable distance.

Figure 5A:
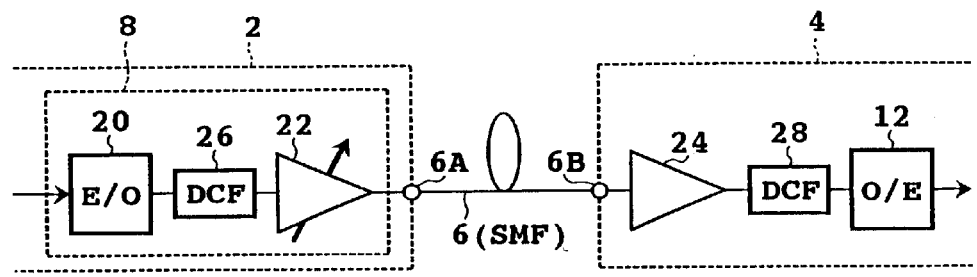
FIGS. 5A to 5C are diagrams for illustrating a transmittable distance in the case of using an SMF (single-mode fiber)

In contrast to the system shown in FIG. 3A, the system shown in FIG. 5A is characterized in that an SMF is used as the optical fiber transmission line 6. In the case that an SMF is used as the optical fiber transmission line 6, the zero-dispersion wavelength of the SMF is about 1.3 $\mu$m, and the wavelength of the optical signal to be output from the optical transmitter 8 falls in a 1.55 $\mu$m band as mentioned previously, so that only an anomalous dispersion region is given. In view of the fact that the dispersion in an SMF in a 1.55 $\mu$m band is relatively large, dispersion compensating fibers (DCF) 26 and 28 are adopted in this system to compensate for chromatic dispersion in the optical fiber transmission line 6. The DCF 26 is optically connected between the E/O converter 20 and the optical amplifier 22, and the DCF 28 is optically connected between the optical amplifier 24 and the O/E converter 12. The dispersion compensation for the optical fiber transmission line 6 may be carried out by any one of the DCFs 26 and 28.

An optical fiber having a dispersion whose absolute value is sufficiently larger than the absolute value of a dispersion in an SMF may be used as each of the DCFs 26 and 28, so as to suppress losses. The dispersion in each DCF falls in a normal dispersion region, thereby performing dispersion compensation.

Figure 5B:
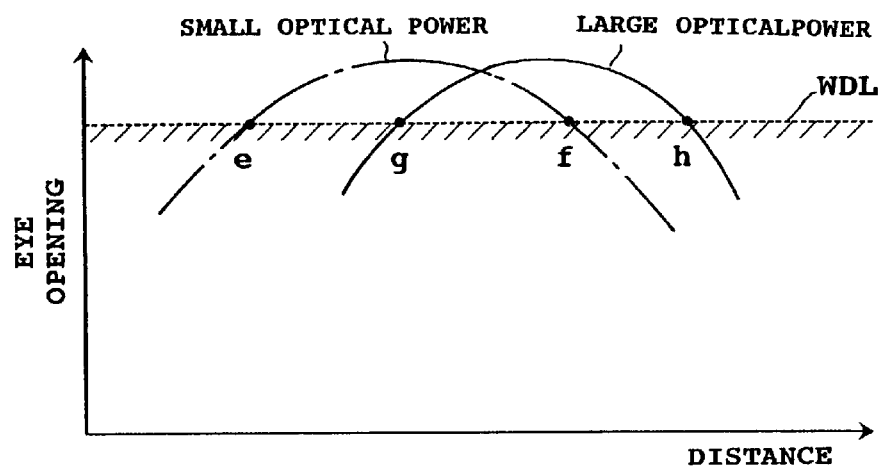
Figure 5C:
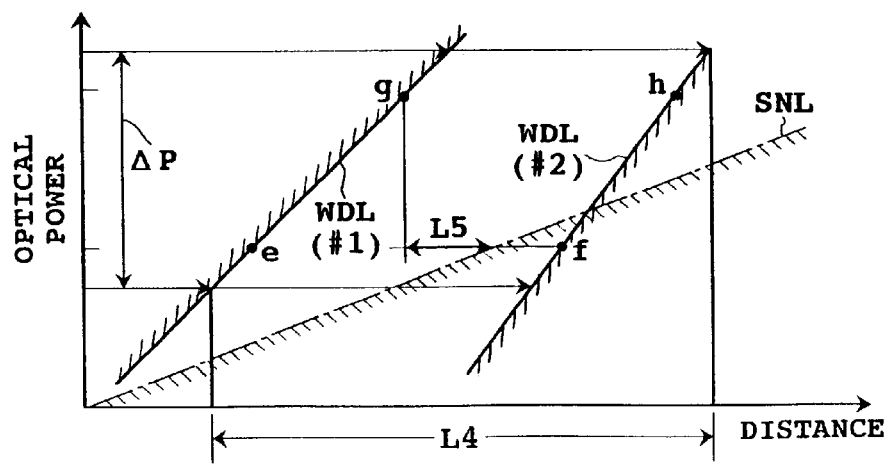

FIGS. 5B and 5C correspond to FIGS. 4A and 3B, respectively. In the case that the DCFs 26 and 28 are used, the dispersion induced by these fibers is constant. Accordingly, in each of the cases that the optical power of the optical signal to be output from the optical transmitter 8 is large and small, there exists an optimum value of the distance giving a maximum value of the eye opening as shown in FIG. 5B. Accordingly, in the case that the optical power is small, the transmittable distance is limited to the range between a distance (e) below which the eye opening is lower than the WDL and a distance (f) above which the eye opening is lower than the WDL. In the case that the optical power is large, the transmittable distance is limited to the range between a distance (g) (e<g) below which the eye opening is lower than the WDL and a distance (h) (f<h) above which the eye opening is lower than the WDL.

Accordingly, the condition for obtaining a fixed transmission quality in the system shown in FIG. 5A is given by a region between two lines WDL(#1) and WDL(#2) corresponding to the WDL and on the left side of an SNL as shown in FIG. 5C. For example, in the case that the variable range of the optical power of the optical signal to be output from the optical transmitter 8 is set to ΔP, the transmittable distance falls within a relatively wide range shown by reference symbol L4 in FIG. 5C.

In the prior art, the range of the optical output power from an optical transmitter is fixedly assigned in general to design a system in consideration of variations in the optical power within this range. Accordingly, the transmittable distance range L5 is determined (or limited) by the worst condition. To the contrary, by controlling or adjusting the optical power of the optical signal to be output from the optical transmitter 8 by the method according to the present invention, a good transmission quality can always be obtained according to the state of the optical fiber transmission line 6, thereby obtaining a long transmittable distance or obtaining a wide transmittable distance range.

Figure 6:
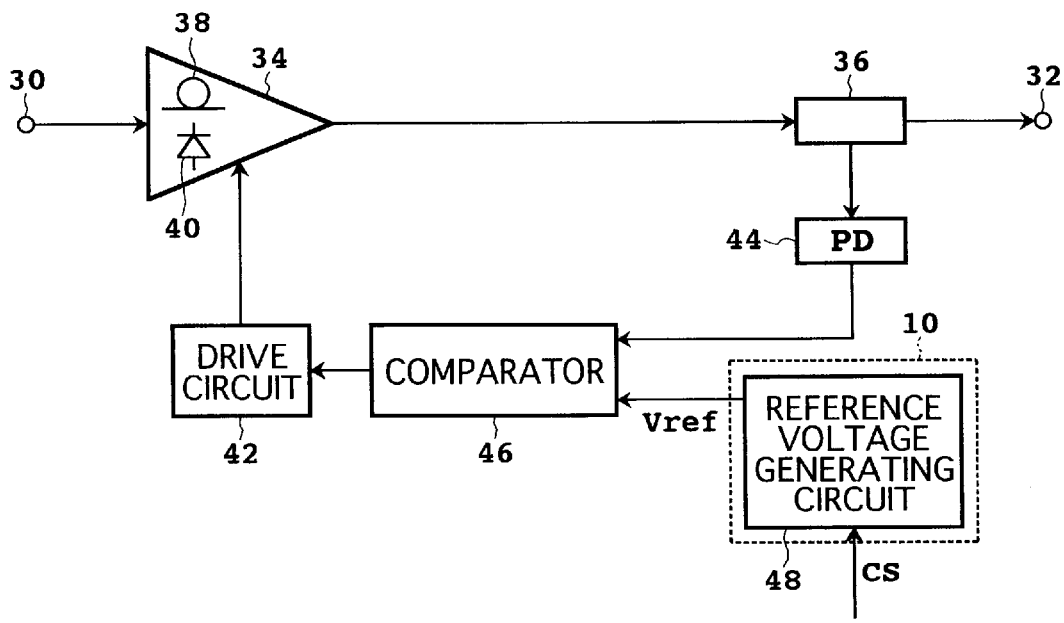
FIG. 6 is a block diagram showing a preferred embodiment of an optical amplifier applicable to the present invention.

FIG. 6 is a block diagram showing a preferred embodiment of an optical amplifier applicable to the present invention. This optical amplifier may be used as the optical amplifier 22 (postamplifier), the optical amplifier 24 (preamplifier), or an optical amplifier included in an optical repeater to be hereinafter described. The optical amplifier shown in FIG. 6 includes an input port 30 to which an optical signal to be amplified is supplied, an output port 32 for outputting an optical signal amplified, and an amplifying unit 34 and an optical coupler 36 both provided along a main optical path extending between the input port 30 and the output port 32.

The amplifying unit 34 includes an optical amplifying medium to which the optical signal from the input port 30 is supplied, and a pumping unit for pumping the optical amplifying medium so that the optical amplifying medium gives a gain to the optical signal supplied. In the case that a semiconductor chip obtained by reducing a reflectance on the opposite end faces of a laser diode is used as the optical amplifying medium, the pumping unit is provided by a current source for supplying an injection current to the semiconductor chip. In this case, a gain determined according to the injection current is given to the optical signal.

In this preferred embodiment, an erbium doped fiber (EDF) 38 is used as the optical amplifying medium, so as to adapt it to an optical signal having a wavelength falling in a 1.55 μm band. The EDF 38 has a first end optically connected to the input port 30 and a second end optically connected to the optical coupler 36. The pumping unit is provided by a laser diode 40 as a pumping source for supplying pump light having a predetermined wavelength to the EDF 38. The wavelength of the pump light is set to fall in a 0.98 μm band or a 1.48 μm band, for example. By optically connecting the laser diode 40 through a WDM coupler (not shown) to the first end of the EDF 38, the optical signal and the pump light propagate in the EDF 38 in the same direction, thereby performing forward pumping. In the case of optically connecting the laser diode 40 through a WDM coupler (not shown) to the second end of the EDF 38, the optical signal and the pump light propagate in the EDF 38 in opposite directions, thereby performing backward pumping. Alternatively, bidirectional pumping may be performed by optically connecting a first pumping source through a first WDM coupler to the first end of the EDF 38, and optically connecting a second pumping source through a second WDM coupler to the second end of the EDF 38.

The laser diode 40 is supplied with a drive current (DC bias current) from a drive circuit 42, so that a gain determined according to the drive current is generated in the EDF 38. Most of the optical signal amplified in the amplifying unit 34 according to the given gain is passed through the optical coupler 36 and output from the output port 32. The remainder of the amplified optical signal is branched off as monitor light by the optical coupler 36, and the monitor light is supplied to a photodetector (PD) 44 such as a photodiode. The photodetector 44 outputs a signal having a voltage level corresponding to the power of the monitor light received. In general, the optical coupler 36 has a branching ratio not dependent on the power of an optical signal supplied, so that the optical power of the optical signal to be output from the output port 32 is reflected by the voltage level of the output signal from the photodetector 44. The output signal from the photodetector 44 is supplied to a comparator 46. The comparator 46 feedback controls the drive current to be supplied from the drive circuit 42 to the laser diode 40 so that the difference between the voltage level of the output signal from the photodetector 44 and a reference voltage Vref becomes zero or constant.

By adopting such a feedback loop, the optical power of the optical signal to be output from the output port 32 can be maintained at a constant level determined by the reference voltage Vref (Automatic Level Control: ALC). Particularly in this preferred embodiment, the control unit 10 (see FIG. 1)) is provided by a reference voltage generating circuit 48. The circuit 48 generates the reference voltage Vref according to the control signal CS supplied. Accordingly, a target value of ALC by this optical amplifier can be predetermined according to the control signal CS.

Figure 7:
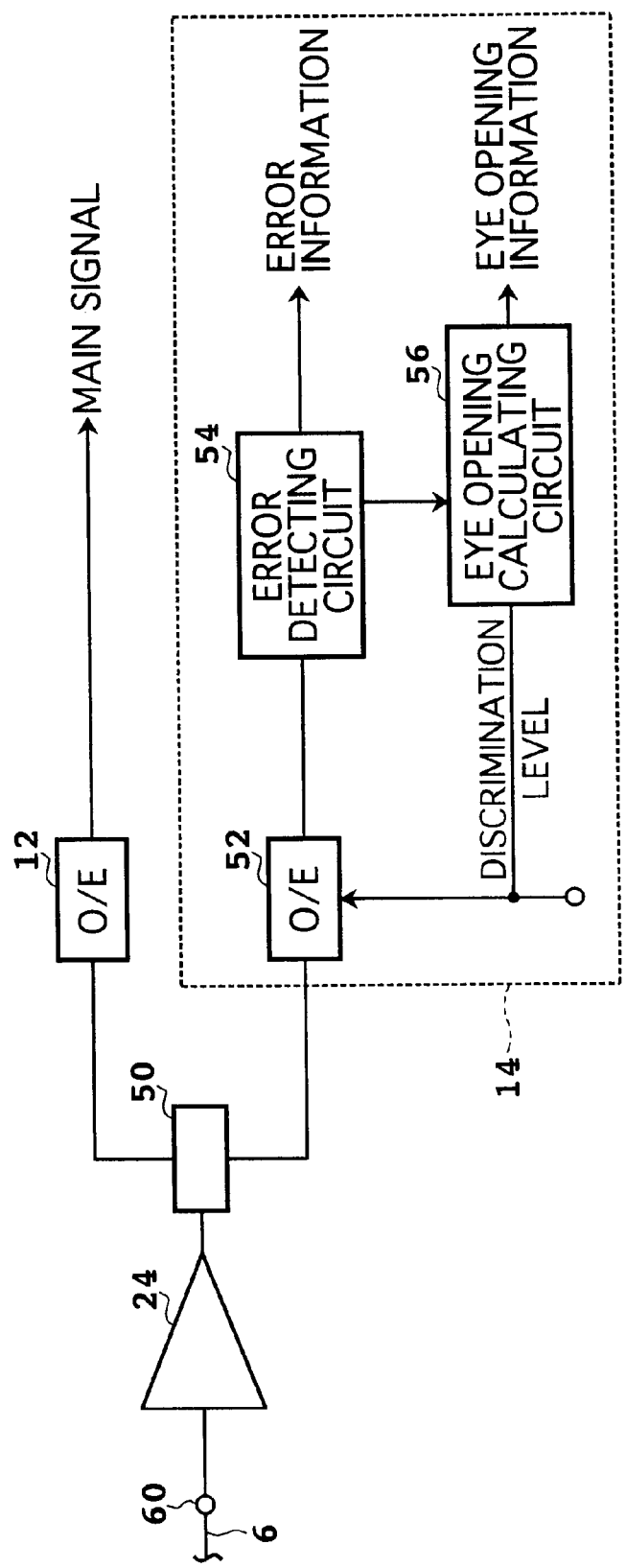
FIG. 7 is a block diagram showing a preferred embodiment of a monitor unit.

FIG. 7 is a block diagram showing a preferred embodiment of the monitor unit 14 shown in FIG. 1. An optical signal transmitted by the optical fiber transmission line 6 is amplified by the optical amplifier 24 as a preamplifier, and an amplified optical signal is branched into a first signal beam and a second signal beam by an optical coupler 50. The first signal beam is supplied to a first O/E converter (optical receiver) 12. The O/E converter 12 regenerates a main signal according to the signal beam received. The second signal beam is supplied to a second O/E converter 52 included in the monitor unit 14. An output signal from the O/E converter 52 is supplied to an error detecting circuit 54, thereby obtaining error information on a bit error rate of the main signal. The O/E converter 52 is supplied with a variable discrimination level, and an eye opening calculating circuit 56 can calculate an eye opening according to the discrimination level and the error information obtained by the error detecting circuit 54. The eye opening thus obtained is provided as eye opening information.

Figure 8:
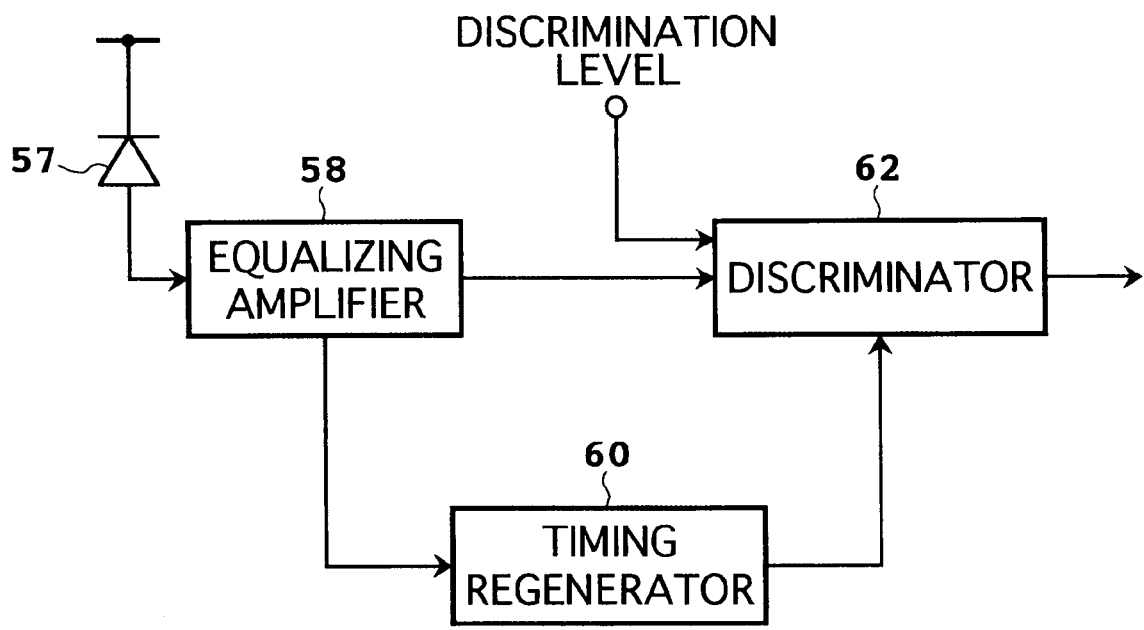
FIG. 8 is a block diagram showing a preferred embodiment of an O/E converter in the monitor unit shown in FIG. 7.

Referring to FIG. 8, there is shown a specific configuration of the O/E converter 52 in the monitor unit 14 shown in FIG. 7. The second signal beam from the optical coupler 50 (see FIG. 7) is supplied to a reverse-biased photodiode 57. The potential at the anode of the photodiode 57 changes with a change in intensity or optical power due to modulation of the signal beam supplied to the photodiode 57, so that the change in the anode potential is an output electrical signal from the photodiode 57. The output electrical signal is equalization-amplified by an equalizing amplifier 58, and an equalization-amplified signal is supplied to a discriminator 62. A timing regenerator 60 regenerates a clock according to a signal from the equalizing amplifier 58. The discriminator 62 discriminates between a high level and a low level of the equalization-amplified signal at a corresponding timing according to the clock from the timing regenerator 60 and the discrimination level being supplied.

The O/E converter 12 for the main signal may be obtained by modifying the configuration of the O/E converter 52 shown in FIG. 8 in such a manner that the discrimination level to be supplied to the discriminator 62 becomes constant.

According to the preferred embodiment shown in FIG. 7, the parameter (bit error rate or eye opening) related to waveform degradation can be detected by the monitor unit 14 while obtaining the main signal from the O/E converter 12. Accordingly, control of the optical power to an optimum value can be continuously performed even in an in-service condition of the system after initialization thereof.

While the first and second beams are used in the preferred embodiment shown in FIG. 7, the optical coupler 50 and the O/E converter 52 may be omitted, in which an output signal from an equalizing amplifier included in the O/E converter 12 is branched into first and second signals, the first signal being used for demodulation of the main signal, the second signal being used for error detection and eye opening calculation. In this case, the receiving power of the O/E converter 12 can be increased and the number of optical components can be reduced.

Figure 9:
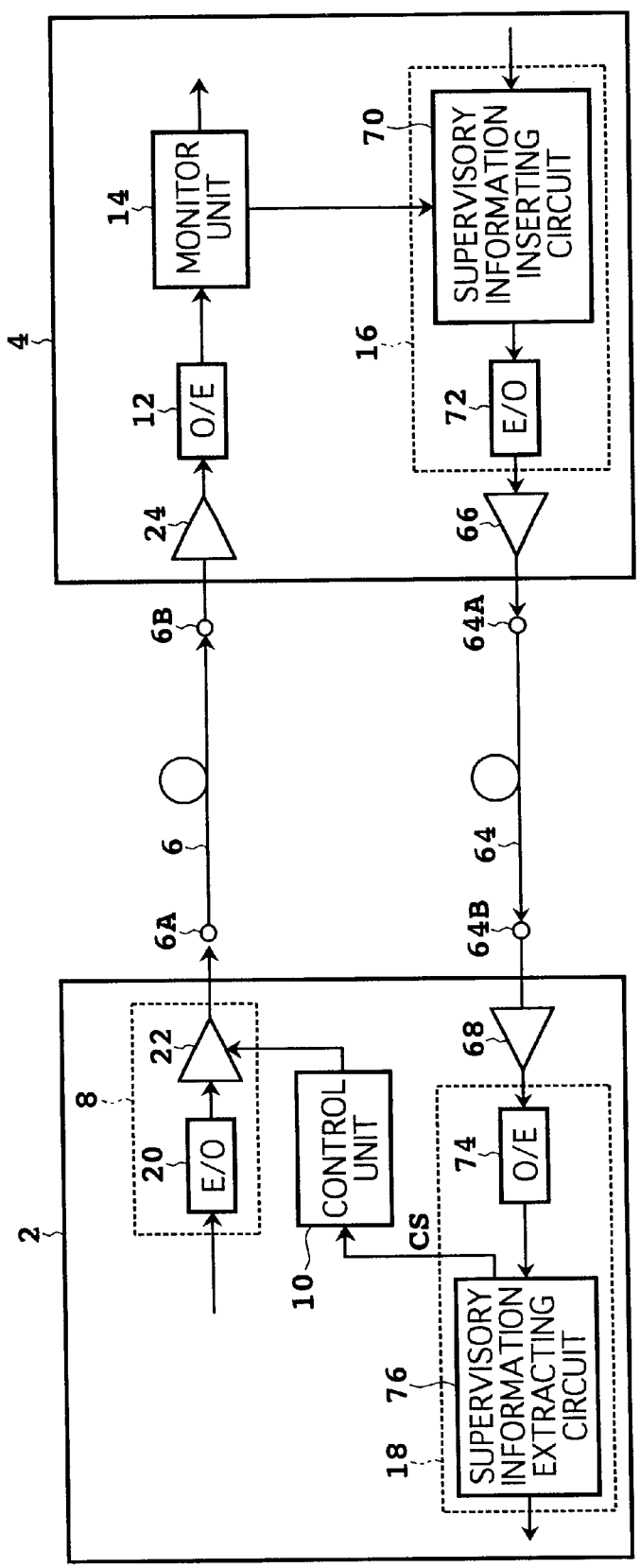
FIG. 9 is a block diagram showing a preferred embodiment of the system according to the present invention.

FIG. 9 is a block diagram showing a preferred embodiment of the system according to the present invention. In this preferred embodiment, an optical fiber transmission line 64 different from the optical fiber transmission line 6 is used for transmission of supervisory information from the second terminal device 4 to the first terminal device 2. That is, the optical fiber transmission line 6 is used as a downstream line directed from the first terminal device 2 toward the second terminal device 4, and the optical fiber transmission line 64 is used as an upstream line directed from the second terminal device 4 toward the first terminal device 2.

An optical signal inclusive of the supervisory information output from the transmitting unit 16 in the second terminal device 4 is amplified by an optical amplifier 66 as a postamplifier, and an amplified optical signal output from the optical amplifier 66 is supplied into the optical fiber transmission line 64 from its first end 64A. An optical signal output from the second end 64B of the optical fiber transmission line 64 is amplified by an optical amplifier 68 as a preamplifier, and an amplified optical signal output from the optical amplifier 68 is supplied into the receiving unit 18 in the first terminal device 2.

The transmitting unit 16 includes a supervisory information inserting circuit 70 for inserting supervisory information related to a parameter detected by the monitor unit 14 into a main signal to be transmitted by the upstream line, and an E/O converter 72 for converting an output signal from the circuit 70 into an optical signal.

The receiving unit 18 includes an O/E converter 74 for converting an optical signal amplified by the optical amplifier 68 into an electrical signal, and a supervisory information extracting circuit 76 for extracting the supervisory information from the output signal from the O/E converter 74. The circuit 76 generates the control signal CS according to the extracted supervisory information.

According to the system shown in FIG. 9, the optical power of the optical signal to be output from the optical transmitter 8 in the first terminal device 2 can be controlled to an optimum value according to the supervisory information transmitted by the optical fiber transmission line 64. This control will now be described more specifically.

At starting up the system, the launch power of an optical signal according to the kind of the optical fiber transmission lines 6 and 64 (SMF/DSF) and the transmission distance is set in order to obtain a condition where the optical signal is allowed to pass through each of the optical fiber transmission lines 6 and 64 to some extent. Further, in the case that the combination of an SMF and a DCF is adopted as shown in FIG. 5A, the dispersion of the DCF is also set.

In the next step, the optical power of the optical signal to be output from the optical transmitter 8 in the first terminal device 2 is changed to detect a parameter (e.g., bit error rate) related to waveform degradation by the monitor unit 14 in the second terminal device 4. In this case, supervisory information is obtained according to error information, so that the supervisory information thus obtained is transmitted from the transmitting unit 16 to the receiving unit 18.

In the first terminal device 2, an optimum value of the optical power of the optical signal to be output from the optical transmitter 8 can be obtained from the correspondence between the change in the optical power and the error information. Accordingly, the control signal CS is generated so as to obtain the optimum optical power. In this manner, the optical power of the optical signal to be output from the optical transmitter 8 to the optical fiber transmission line 6 can be maintained always at an optimum value, thus allowing compensation for chromatic dispersion and nonlinearity.

While the optical power of the optical signal to be output to the optical fiber transmission line 6 is optimized in this preferred embodiment, the optical power of an optical signal to be output to the optical fiber transmission line 64 may be optimized by reversing the functions of the terminal devices 2 and 4. Such a modification can be made very easily by those skilled in the art, so the description thereof will be omitted herein.

The optimization of the optical power must be carried out in an initial stage where equipment is introduced into a line or in the event of troubleshooting, for example. However, once the system falls into a running condition, the transmission conditions become substantially fixed, so that the possibility of a large change in the optimum value of the optical power is low. Accordingly, the optical power of the optical signal to be output from the optical transmitter 8 may be adjusted manually according to the method of the present invention rather than by the automatic control using the control unit 10 as in the system shown in FIG. 9.

Figure 10:
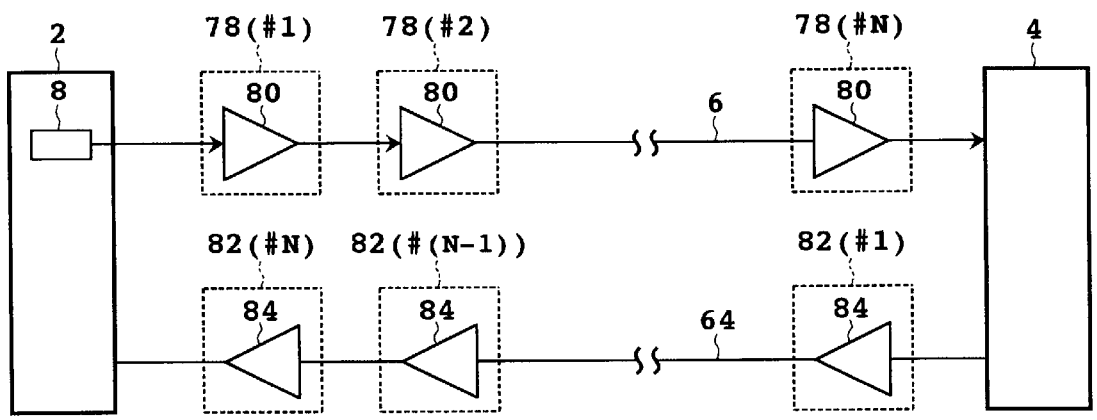
FIG. 10 is a block diagram showing another preferred embodiment of the system according to the present invention.

FIG. 10 is a block diagram showing another preferred embodiment of the system according to the present invention. The system shown in FIG. 10 is characterized in that a plurality of optical repeaters 78(#1) to 78(#N) (N is an integer greater than 1) are arranged along the optical fiber transmission line 6, in contrast to the system shown in FIG. 1 or FIG. 9. Each of the optical repeaters 78(#1) to 78(#N) is provided as a linear repeater. The linear repeater is a repeater for amplifying a received optical signal in an analog manner, and it is distinguished from a regenerative repeater designed to perform waveform shaping or the like. Each of the optical repeaters 78(#1) to 78(#N) has an optical amplifier 80 for amplifying a received optical signal. Particularly in this preferred embodiment, a plurality of optical repeaters 82(#1) to 82(#N) are also arranged along the optical fiber transmission line 64. Each of the optical repeaters 82(#1) to 82(#N) has an optical amplifier 84.

Some application forms of the present invention particularly to the optical fiber transmission line 6 in the system shown in FIG. 10 will now be described.

In a first application form, the output level (the optical power of an output optical signal) from each optical amplifier 80 is set (fixed) to a constant value. In this case, the influence of nonlinearity due to a high output level from each optical amplifier 80 is substantially constant. Accordingly, the optical power of the optical signal to be output from the optical transmitter 8 in the first terminal device 2 can be easily set to an optimum value according to the present invention. Each optical amplifier 80 may employ the configuration of the optical amplifier shown in FIG. 6 with the reference voltage Vref set constant.

In a second application form, the output level of the optical transmitter 8 and the output level of each optical amplifier 80 are set substantially equal to each other. That is, the output levels of the optical transmitter 8 and each optical amplifier 80 are adjusted according to the control signal CS (see FIG. 9).

In a third application form, the output levels of the optical transmitter 8 and the optical amplifiers 80 are adjusted sequentially from the first terminal device 2 toward the second terminal device 4 or from the second terminal device 4 toward the first terminal device 2.

In each of the second and third application forms, the output level (or gain) of each optical amplifier 80 is changed according to the control signal CS. Accordingly, in the case that the optical amplifier shown in FIG. 6 is used as each optical amplifier 80, the reference voltage Vref is adjusted according to the control signal CS.

In each of the second and third application forms, the control signal CS is required in each of the optical repeaters 78(#1) to 78(#N). Accordingly, it is necessary to transmit specific supervisory information including the control signal CS from the first terminal device 2 to each of the optical repeaters 78(#1) to 78(#N).

Figure 11:
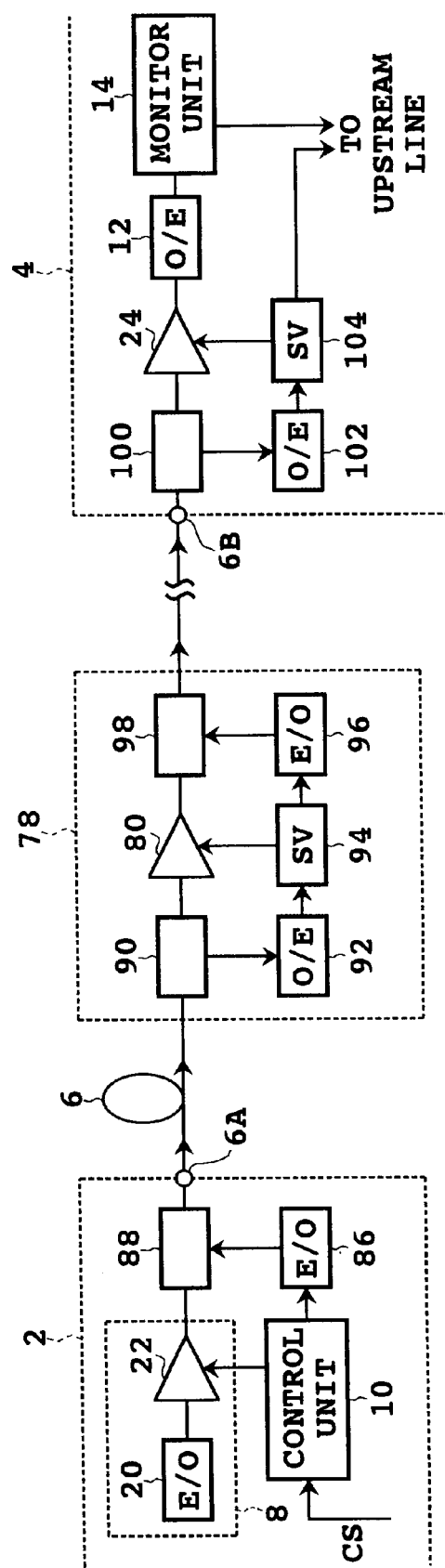
FIG. 11 is a block diagram showing a modification for transmitting specific supervisory information in the system shown in FIG. 10.

FIG. 11 is a block diagram showing a modification for transmitting specific supervisory information in the system shown in FIG. 10. In this modification, the first terminal device 2 has an E/O converter 86 for converting specific supervisory information (supervisory signal) generated according to the control signal CS into a supervisory optical signal. The supervisory optical signal output from the E/O converter 86 is combined with an optical signal related to a main signal output from the optical transmitter 8 by a WDM (wavelength division multiplexing) coupler 88. Accordingly, the wavelength of the supervisory optical signal is different from the wavelength of the optical signal output from the optical transmitter 8.

Reference numeral 78 denotes each of the optical repeaters 78(#1) to 78(#N) shown in FIG. 10. In each optical repeater 78, the supervisory optical signal is extracted by a WDM coupler 90, and the extracted supervisory signal is converted into a supervisory signal by an O/E converter 92. The supervisory signal output from the O/E converter 92 is supplied to a supervisory circuit (SV) 94. The supervisory circuit 94 adjusts the output level (or gain) of the optical amplifier 80 according to the supervisory signal. For example, in the case that the optical amplifier shown in FIG. 6 is used as the optical amplifier 80, the reference voltage Vref is set according to the supervisory signal. The supervisory signal supplied to the supervisory circuit 94 or a supervisory signal updated in the supervisory circuit 94 is converted into a supervisory optical signal by an E/O converter 96. The supervisory optical signal output from the E/O converter 96 is supplied to a WDM coupler 98, in which the supervisory optical signal is combined with an optical signal amplified by the optical amplifier 80.

In the second terminal device 4, the supervisory optical signal is extracted by a WDM coupler 100, and the extracted supervisory optical signal is converted into a supervisory signal by an O/E converter 102. The supervisory signal output from the O/E converter 102 is supplied to a supervisory circuit 104, and an output signal from the supervisory circuit 104 is fed to the upstream line together with an output signal from the monitor unit 14.

A control flow in the system shown in FIG. 10 (FIG. 11) will now be described with reference to FIG. 12 in the case of carrying out the third application form.

In step 112, initial information on the transmission lines is input. Examples of the initial information include the kind of the transmission lines (DSF/SMF/others), the distance of each repeater spacing, the presence/absence of a dispersion compensator, the dispersion in the case that the dispersion compensator is present, and parameters of the transmission lines (loss coefficient, dispersion coefficient, and nonlinear coefficient).

In step 114, the output levels of the optical transmitter 8 and each optical amplifier 80 are initially set according to the input initial information, in order that the optical signal from the first terminal device 2 is transmitted to the second terminal device 4 with a certain level of transmission quality.

In step 116, optimum detection and setting are started. Step 116 is executed in the order of the downstream line (the optical fiber transmission line 6) and the upstream line (the optical fiber transmission line 64), for example.

In step 118, the optimum detection and setting for each section of the downstream line are carried out. In other words, the output levels of the optical transmitter 8 and the optical repeaters 78(#1) to 78(#N) are set in this order.

In step 120, it is determined whether or not the setting for all the lines has been finished. If the setting for all the lines has not yet been finished, the program returns to step 116 to start the optimum detection and setting for the upstream line.

At the time the setting for all the lines has been finished, the program proceeds to step 122, in which the set information is recorded into a memory device associated with a CPU provided in the first terminal device 2, for example.

Figure 12:
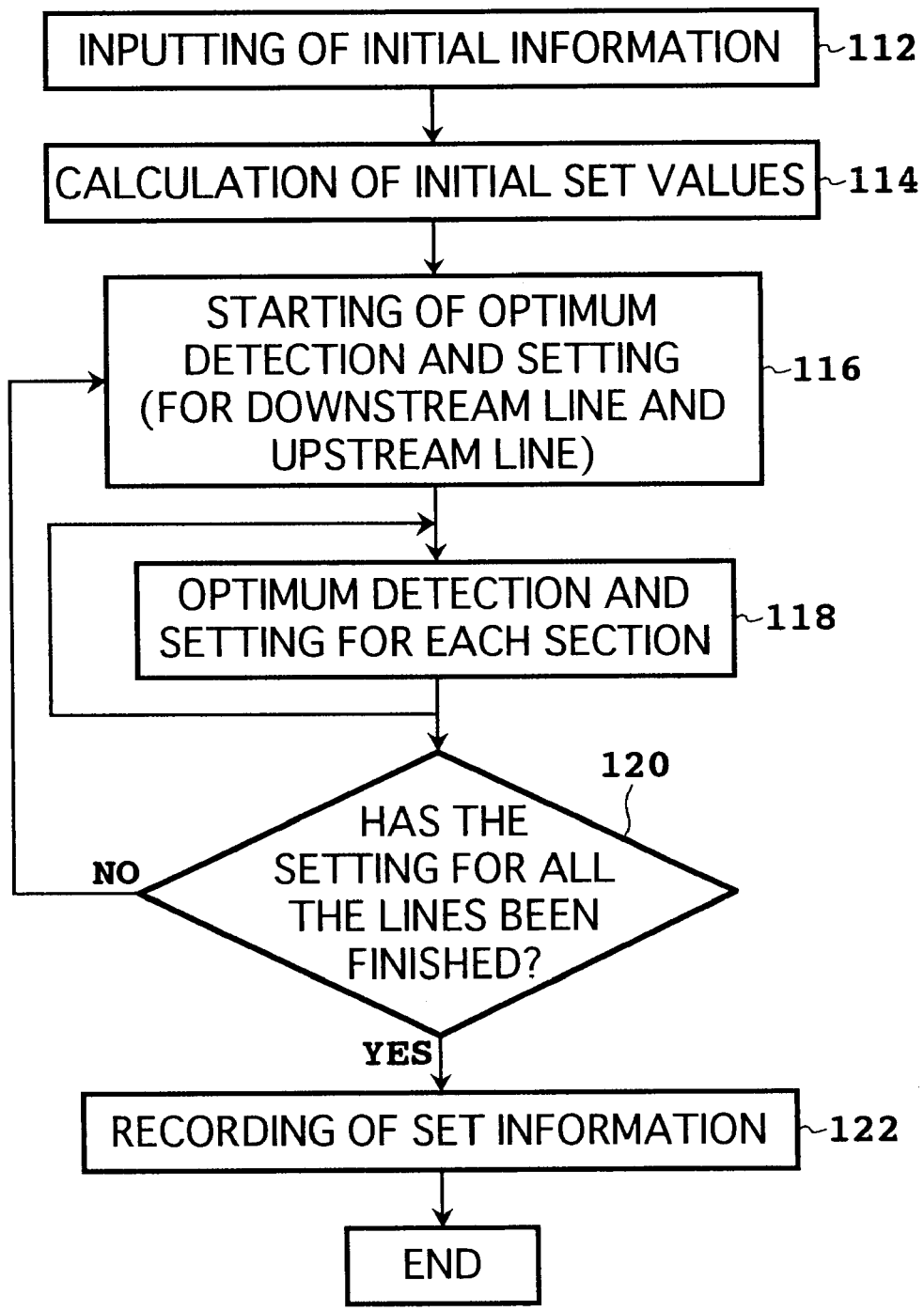
FIG. 12 is a flowchart showing a control flow in the system shown in FIG. 10 (FIG. 11).

While the setting operation by the control flow shown in FIG. 12 is carried out for the downstream line sequentially from the first terminal device 2 toward the second terminal device 4, the setting operation may be carried out in reverse order. Further, the setting operation for the upstream line can also be carried out similarly.

According to the present invention as described above, it is possible to provide a method for optical fiber communication which can compensate for chromatic dispersion and nonlinearity to allow long-haul transmission, and also to provide a terminal device and system for use in carrying out the method. The effects obtained by the specific preferred embodiments of the present invention have been described above, so the description thereof will be omitted herein.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A method comprising:
   (a) providing a first terminal device outputting an optical signal having a variable optical power to an optical fiber transmission line, wherein said first terminal device is provided by an optical transmitter connected to one end of said optical fiber transmission line, and a plurality of optical repeaters coupled in series with each other and arranged along said optical fiber transmission line, each optical repeater comprising an optical amplifier amplifying said optical signal;
   (b) converting said optical signal transmitted by said optical fiber transmission line into an electrical signal at a second terminal device;
   (c) detecting a parameter related to waveform degradation of said electrical signal at said second terminal device; and
   (d) transmitting supervisory information indicating said detected parameter to said first terminal device, wherein said first terminal device adjusts an output optical power of said optical transmitter and each of said optical amplifiers in accordance with said transmitted supervisory information to improve waveform degradation at said second terminal device.

2. A method according to claim 1, wherein:
adjusting said output optical power includes adjusting the gain of said optical amplifiers.

3. A method according to claim 1, wherein:
said optical transmitter comprises an electro/optical converter converting an input electrical signal into said optical signal, and an optical amplifier for amplifying said optical signal;
adjusting said output optical power includes adjusting the gain of said optical amplifiers.

4. A method according to claim 1, wherein said parameter is a bit error rate of said electrical signal.

5. A method according to claim 1, wherein said parameter is an eye opening of said electrical signal.

6. A method according to claim 1, wherein adjusting said output optical power includes satisfying a condition where the output powers of said optical transmitter and said optical amplifiers are substantially equal to each other.

7. A method according to claim 1, wherein adjusting said output optical power includes sequentially adjusting the output powers of said optical transmitter and said optical amplifiers.

8. A system comprising:
first and second terminal devices; and
an optical fiber transmission line connecting said first and second terminal devices;
said first terminal device comprising an optical transmitter connected to one end of said optical fiber transmission line and outputting an optical signal having a variable optical power to said optical fiber transmission line, and an optical amplifier included in each of a plurality of optical repeaters coupled in series with each other and arranged along said optical fiber transmission line;
said second terminal device comprising:
an optical receiver converting said optical signal transmitted by said optical fiber transmission line into an electrical signal,
a monitor unit detecting a parameter related to waveform degradation of said electrical signal, and
means for transmitting supervisory information on said parameter detected to said first terminal device;
said first terminal device further comprising a control unit adjusting an output optical power of said optical transmitter and each of said optical amplifiers according to said supervisory information so that the waveform degradation of said electrical signal is improved.

9. A system according to claim 8, wherein:
said optical transmitter comprises an electro/optical converter converting an input electrical signal into said optical signal, and an optical amplifier amplifying said optical signal; and
said control unit adjusts the gain of said optical amplifier.

10. A system according to claim 8, wherein said second terminal device further comprises an optical amplifier amplifying said optical signal to be received by said optical receiver.

11. A system according to claim 8, wherein said optical fiber transmission line comprises a dispersion shifted fiber having a zero-dispersion wavelength near 1.55 $\mu$m.

12. A system according to claim 8, wherein said optical fiber transmission line comprises a single-mode fiber having a zero-dispersion wavelength near 1.3 $\mu$m.

13. A system according to claim 12, further comprising dispersion compensating fibers compensating for chromatic dispersion occurring in said optical fiber transmission line.

14. A system according to claim 8, further comprising a second optical fiber transmission line connecting said first and second terminal devices;
said supervisory information being transmitted from said second terminal device to said first terminal device by said second optical fiber transmission line.

15. A terminal device comprising:
a device comprising an optical transmitter connected to one end of an optical fiber transmission line and outputting an optical signal, having a variable optical power, to said optical fiber transmission line, and an optical amplifier included in each of a plurality of optical repeaters coupled in series with each other and arranged along said optical fiber transmission line;
means for receiving supervisory information on a parameter detected in relation to waveform degradation of said optical signal transmitted by said optical fiber transmission line; and
means for controlling an output optical power of said optical transmitter and each of said optical amplifiers according to said supervisory information so that the waveform degradation of said optical signal is improved.

16. An apparatus comprising:
an optical transmitter transmitting an optical signal to an optical transmission line;
optical amplifiers arranged along the optical transmission line and amplifying the transmitted optical signal; and
an optical receiver receiving the optical signal from the optical transmission line after being amplified by the optical amplifiers, the optical receiver converting the received optical signal into an electrical signal, detecting a parameter of the electrical signal related to waveform degradation, and transmitting supervisory information indicating the detected parameter to the optical transmitter and the optical amplifiers, wherein the optical transmitter adjusts optical power of the transmitted optical signal in accordance with the transmitted supervisory information and each optical amplifier adjusts output power of the respective optical amplifier in accordance with the transmitted supervisory information to improve waveform degradation at the optical receiver.

17. An apparatus comprising:
an optical transmitter transmitting an optical signal to an optical transmission line;
optical amplifiers arranged along the optical transmission line and amplifying the transmitted optical signal;
an optical receiver receiving the optical signal from the optical transmission line after being amplified by the optical amplifiers, the optical receiver converting the received optical signal into an electrical signal, detecting a parameter of the electrical signal related to waveform degradation, and transmitting supervisory information indicating the detected parameter to the optical transmitter and the optical amplifiers;
means for causing the optical transmitter to adjust optical power of the transmitted optical signal in accordance with the transmitted supervisory information, and for causing each optical amplifier to adjust output power of the respective optical amplifier in accordance with the transmitted supervisory information, to improve waveform degradation at the optical receiver.

* * * * *